US012329288B2

(12) United States Patent
Wang et al.

(10) Patent No.: US 12,329,288 B2
(45) Date of Patent: Jun. 17, 2025

(54) REMOTE CONTROL ADJUSTABLE BED AND REMOTE CONTROL METHOD THEREOF

(71) Applicant: Nisco Co., Ltd, Jiangsu (CN)

(72) Inventors: Wei Wang, Jiangsu (CN); Jian Xie, Jiangsu (CN); Yifan Mao, Jiangsu (CN)

(73) Assignee: NISCO CO., LTD, Jiangsu (CN)

( * ) Notice: Subject to any disclaimer, the term of this patent is extended or adjusted under 35 U.S.C. 154(b) by 550 days.

(21) Appl. No.: 17/694,868

(22) Filed: Mar. 15, 2022

(65) Prior Publication Data

US 2022/0304478 A1 Sep. 29, 2022

Related U.S. Application Data

(60) Provisional application No. 63/167,693, filed on Mar. 30, 2021.

(30) Foreign Application Priority Data

Mar. 25, 2021 (CN) ......................... 202110322062.4

(51) Int. Cl.

*A47C 31/00* (2006.01)
*A47C 20/04* (2006.01)
*G08C 17/00* (2006.01)

(52) U.S. Cl.

CPC .......... *A47C 31/008* (2013.01); *A47C 20/041* (2013.01); *G08C 17/00* (2013.01); *G08C 2201/50* (2013.01)

(58) Field of Classification Search

CPC .... A47C 31/008; A47C 20/041; G08C 17/00; G08C 2201/50

See application file for complete search history.

(56) References Cited

U.S. PATENT DOCUMENTS 10,058,467 B2 * 8/2018 Stusynski .............. A61G 7/018
10,492,969 B2 * 12/2019 Stusynski .............. A61G 7/018
10,632,032 B1 * 4/2020 Stusynski ............ A47C 31/008
11,044,996 B2 * 6/2021 Paul ........................ A61G 5/006
11,712,384 B2 * 8/2023 Stusynski .............. A61G 7/018 5/613
2014/0137332 A1 * 5/2014 McGuire .............. A47C 27/081 5/713

(Continued)

*Primary Examiner* — Sisay Yacob

(74) *Attorney, Agent, or Firm* — troutman pepper locke; Tim Tingkang Xia, Esq.

(57) ABSTRACT

The invention relates to a remote control, an adjustable bed and a remote control method thereof. The remote control includes a mode control switch having three position states including an R side position, a middle position and an L side position, and being operably slidable in one of the three position states; a monitoring unit configured to detect the position state of the mode control switch; and a control unit coupled to the monitoring unit and configured to receive the position state of the mode control switch, determine a control mode of the adjustable bed accordingly, and send a matching instruction to one or both of the first and second controllers of the first and second bed units based on the determined control mode so as to establish a matching connection of the remote control with said one or both of the first and second controllers.

8 Claims, 8 Drawing Sheets

(56) References Cited

U.S. PATENT DOCUMENTS

| | | | | |
|---|---|---|---|---|
| 2014/0259419 | A1* | 9/2014 | Stusynski ............ | A47C 20/041<br>5/613 |
| 2015/0007393 | A1* | 1/2015 | Palashewski ........ | A47C 27/082<br>5/713 |
| 2018/0360680 | A1* | 12/2018 | Stusynski .............. | A61G 7/018 |
| 2020/0214449 | A1* | 7/2020 | Paul ....................... | A47C 1/035 |
| 2021/0346218 | A1* | 11/2021 | Stusynski .............. | A61G 7/015 |

* cited by examiner

REMOTE CONTROL ADJUSTABLE BED AND REMOTE CONTROL METHOD THEREOF

CROSS-REFERENCE TO RELATED PATENT APPLICATIONS

This application claims priority to and the benefit of U.S. Provisional Patent Application No. 63/167,693, filed Mar. 30, 2021, which is incorporated herein in its entirety by reference.

This application also claims priority to and the benefit of Chinese Patent Application No. 202110322062.4, filed Mar. 25, 2021, which is incorporated herein in its entirety by reference.

FIELD OF THE INVENTION

The invention generally relates to a bed, and more particular to an adjustable bed, control system and remote control method thereof.

BACKGROUND OF THE INVENTION

Sleep is critical for people in every aspect of their lives. Beds are necessary furniture for people to sleep on. An electric bed generally has a posture adjustment function. Users can adjust the bed to raise the back or legs to a certain angle according to their needs, especially when the user is reading a book, watching TV or resting while sick, lying half-sitting on the bed. The posture is more comfortable, therefore, electric beds are widely used in hospitals and homes.

The existing electric beds generally realize the adjustment of the posture of the bed unit through buttons installed on the side of the bed, and cannot be operated by remote control. In addition, when used as a double bed, independent adjustments of the two bed units cannot be realized.

Therefore, a heretofore unaddressed need exists in the art to address the aforementioned deficiencies and inadequacies.

SUMMARY OF THE INVENTION

In view of the aforementioned deficiencies and inadequacies, one of the objectives of this invention is to provide a remote control, an adjustable bed, and a control system and remote control method thereof, so as to solve the problem that the existing adjustable beds are difficult to operate remotely.

In one aspect, the invention relates to a remote control for controlling operations of an adjustable bed having first and second bed units, wherein the first and second bed units have first and second controllers for control operations of the first and second bed units, respectively. The remote control comprises a mode control switch, wherein the mode control switch has three position states including an R side position, a middle position and an L side position, and is operably slidable in one of the three position states; a monitoring unit configured to detect the position state of the mode control switch; and a control unit coupled to the monitoring unit and configured to receive the position state of the mode control switch detected by the monitoring unit, determine a control mode of the adjustable bed accordingly, and send a matching instruction to one or both of the first and second controllers of the first and second bed units based on the determined control mode so as to establish a matching connection of the remote control with said one or both of the first and second controllers.

In one embodiment, the remote control further comprises a plurality of function keys, wherein each function key, when pressed, in a pressed state is associated with a predetermined operation instruction.

In one embodiment, the plurality of function keys has a start button for operably controlling start or stop of the first and second controllers.

In one embodiment, the remote control is configured such that when any one of the plurality of function keys on the remote control is pressed, the monitoring unit detects the pressed state of the pressed function key, and the control unit receives the pressed state of the pressed function key detected by the monitoring unit and sends said operation instruction to said one or both of the first and second controllers according to the pressed function key.

In one embodiment, the remote control is configured such that when the monitoring unit detects that the mode control switch is in the middle position, the control unit sends the matching instruction to the first and second controllers, after the matching is completed, when a function key in the remote control is pressed, the control unit sends the operation instruction associated with the pressed function key to the first and second controllers.

In one embodiment, the remote control is configured such that when the monitoring unit detects that the mode control switch is in the R side position and a main key in the remote control is pressed, the control unit sends the matching instruction to the first controller, after the matching is completed, when a function key in the remote control is pressed, the control unit sends the operation instruction associated with the pressed function key to the first controller.

In one embodiment, the remote control is configured such that when the monitoring unit detects that the mode control switch is in the L side position and a main key in the remote control is pressed, the control unit sends the matching instruction to the second controller, after the matching is completed, when a function key in the remote control is pressed, the control unit sends the operation instruction associated with the pressed function key to the second controller.

In another aspect, the invention relates to an adjustable bed comprising first and second bed units, and a remote control for controlling operations of the first and second bed units individually or cooperatively. The first and second bed units have first and second driving assemblies configured to operably adjust postures of the first and second bed units, and first and second controllers coupled to the first and second driving assemblies to control operations of the first and second driving assemblies, respectively. Each of the first and second controllers comprises a receiving unit configured to receive a matching instruction and an operation instruction sent by the remote control, and a processing control unit coupled to the receiving unit and configured to process the matching instruction and the operation instruction, connect to the remote control for matching connection, and control an operation of the corresponding one of the first and second drive assemblies according to the operation instruction.

In one embodiment, the remote control has a plurality of function keys. Each function key, when pressed, in a pressed state is associated with a predetermined operation instruction.

In one embodiment, the plurality of function keys has a start button for operably controlling start or stop of the first and second controllers.

In yet another aspect, the invention relates to a method for remote control of an adjustable bed having first and second bed units, wherein the first and second bed units have first and second driving assemblies configured to operably adjust postures of the first and second bed units, and first and second controllers coupled to the first and second driving assemblies to control operations of the first and second driving assemblies, respectively. The method comprises matching a remote control with one or both of the first and second controllers of the first and second bed units of the adjustable bed, comprising detecting a position state of a mode control switch of the remote control; determining a control mode of the adjustable bed based on the detected position state of the mode control switch; and sending a matching instruction to said one or both of the first and second controllers so as to establish a matching connection of the remote control with said one or both of the first and second controllers; and initiating operation instruction of one or both of the first and second bed units from the remote control so as to remotely operate the first and second bed units of the adjustable bed individually or cooperatively.

In one embodiment, when the mode control switch is detected in the middle position, the remote control sends a matching instruction to the first and second controllers, after the remote control is matched and coupled with the first and second controllers of the first and second bed units of the adjustable bed, pressing a function key in the remote control causes the first and second controllers to receive the operation instruction associated with the pressed function key.

In one embodiment, when the mode control switch is detected in the R side position and a main key in the remote control is pressed, the remote control sends a matching instruction to the first controller corresponding to the R side position, after the remote control is matched and coupled with the first controller, pressing a function key in the remote control causes the first controller to receive the operation instruction associated with the pressed function key.

In one embodiment, when the mode control switch is detected in the L side position and a main key in the remote control is pressed, the remote control sends a matching instruction to the second controller corresponding to the L side position, after the remote control is matched and coupled with the second controller, pressing a function key in the remote control causes the second controller to receive the operation instruction associated with the pressed function key.

In one embodiment, said initiating the operation instruction comprises pressing a function key in the remote control corresponding to a head adjustment; sending, by the remote control, the operation instruction for adjusting the head posture to said one or both of the first and second controllers; and operating, by said one or both of the first and second controllers, the corresponding one or both of the first and second drive assemblies to adjust the head posture of the corresponding one or both of the first and second bed units accordingly.

In one embodiment, said initiating the operation instruction comprises pressing a function key in the remote control corresponding to a back adjustment; sending, by the remote control, the operation instruction for adjusting the back posture to said one or both of the first and second controllers; and operating, by said one or both of the first and second controllers, the corresponding one or both of the first and second drive assemblies to adjust the back posture of the corresponding one or both of the first and second bed units accordingly.

In one embodiment, said initiating the operation instruction comprises pressing a function key in the remote control corresponding to a leg adjustment; sending, by the remote control, the operation instruction for adjusting the leg posture to said one or both of the first and second controllers; and operating, by said one or both of the first and second controllers, the corresponding one or both of the first and second drive assemblies to adjust the leg posture of the corresponding one or both of the first and second bed units accordingly.

In one embodiment, said initiating the operation instruction comprises pressing a function key in the remote control corresponding to a reset; sending, by the remote control, the operation instruction for returning to the flat state to said one or both of the first and second controllers; and operating, by said one or both of the first and second controllers, the corresponding one or both of the first and second drive assemblies to return the first and second bed units to the flat state accordingly.

In one embodiment, said initiating the operation instruction comprises pressing a function key in the remote control corresponding to a head adjustment; cyclically sending, by the remote control, the operation instruction for adjusting the head posture to the first and second controllers; and operating, by the first and second controllers, the first and second drive assemblies to adjust the head posture of the first and second bed units accordingly.

In one embodiment, said initiating the operation instruction comprises pressing a function key in the remote control corresponding to a back adjustment; cyclically sending, by the remote control, the operation instruction for adjusting the back posture to the first and second controllers; and operating, by the first and second controllers, the first and second drive assemblies to adjust the back posture of the first and second bed units accordingly.

In one embodiment, said initiating the operation instruction comprises pressing a function key in the remote control corresponding to a leg adjustment; cyclically sending, by the remote control, the operation instruction for adjusting the leg posture to the first and second controllers; and operating, by the first and second controllers, the first and second drive assemblies to adjust the leg posture of the first and second bed units accordingly.

In one embodiment, said initiating the operation instruction comprises pressing a function key in the remote control corresponding to a reset; cyclically sending, by the remote control, the operation instruction for returning to the flat state to the first and second controllers; and operating, by the first and second controllers, the first and second drive assemblies to return the first and second bed units to the flat state accordingly.

As disclosed above, the remote control, adjustable bed and its control system and remote control method of the invention have the following beneficial effects: the mode control switch is set on the remote control, and the control mode of the adjustable bed is determined by sliding operation, and a remote control is realized. The device can control the first and second controllers synchronously, or independently control the first and second controllers, so as to realize the synchronous action and independent action of the two bed units of the adjustable bed.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
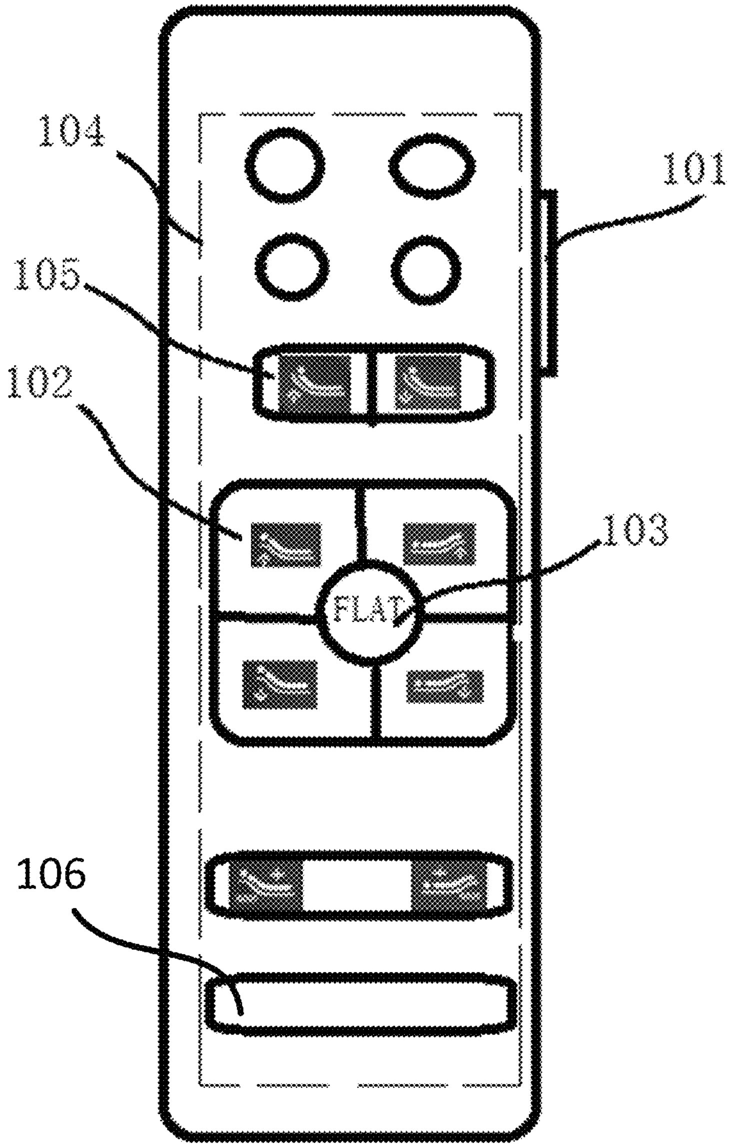
FIG. 1 shows schematically a remote control according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Furthermore, relative terms, such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper" depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising" or "includes" and/or "including" or "has" and/or "having", or "carry" and/or "carrying," or "contain" and/or "containing" or "involve" and/or "involving", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on", "attached" to, "connected" to, "coupled" with, "contacting", etc., another element, it can be directly on, attached to, electrically coupled to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

As used in this disclosure, the term "platform(s)" refers to bed platform(s), or bed board(s).

Embodiments of the invention are illustrated in detail hereinafter with reference to accompanying drawings in FIGS. 1-10. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in one aspect, relates to a remote control, an adjustable bed, a control system and a remote control method thereof.

The remote control is provided for controlling operations of an adjustable bed having first and second bed units. The first bed unit has a first controller for control operations of the first bed unit, and the second bed unit has a second controller for control operations of the second bed unit.

Figure 2:
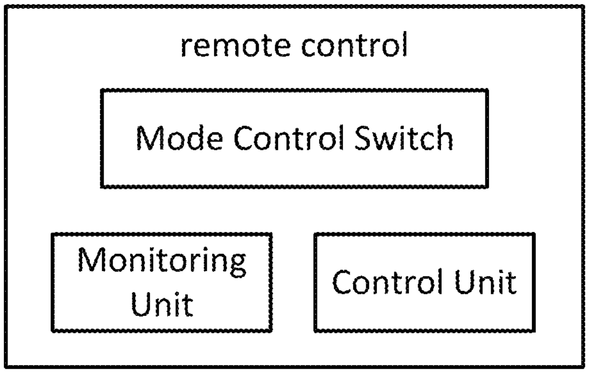
FIG. 2 shows schematically a diagram block of a remote control according to embodiments of the invention.

In some embodiments as shown in FIGS. 1-2, the remote control comprises a slidable mode control switch 101. The mode control switch 101 has three position states including an R side position, a middle position and an L side position, and is operably slidable in one of the three position states. In one embodiment, the mode control switch 101 can be pushed up to the R side position, pushed down to the L side position, and pushed in the middle to the middle position, respectively. In some embodiments, the mode control switch 101 is set on the remote control, and the switch is toggled to realize the connections with the first and second bed units of the adjustable bed.

As shown in FIG. 2, the remote control also comprises a monitoring unit configured to detect the position state of the mode control switch; and a control unit coupled to the monitoring unit and configured to receive the position state of the mode control switch detected by the monitoring unit, determine a control mode of the adjustable bed accordingly, and send a matching instruction/command to one or both of the first and second controllers of the first and second bed units based on the determined control mode so as to establish a matching connection of the remote control with said one or both of the first and second controllers. In the control mode, a matching instruction/command is sent to the corresponding one or both of the first and second controllers on the adjustable bed, and the matching connection is established with the corresponding controller(s).

In some embodiments, the remote control 101 further comprises a plurality of function keys/buttons 102, 103, 105. Each function key, when pressed, in a pressed state is associated with a predetermined operation instruction. For example, the left one of key 105, when pressed, is corresponding to an operation instruction of lifting up the head/back portion of one or both of the first and second bed units, while the right one of key 105, when pressed, is corresponding to an operation instruction of putting down the head/back portion of one or both of the first and second bed units, depending upon the control mode. In one embodiment, the main key/button 102 includes four keys/buttons with each corresponding to a different operation instruction. The plurality of function keys may also have a start button 106 for operably controlling start or stop of the first and second controllers.

In some embodiments, the remote control is configured such that when any one of the plurality of function keys on the remote control is pressed, the monitoring unit detects the pressed state of the pressed function key, and the control unit receives the pressed state of the pressed function key detected by the monitoring unit and sends said operation instruction to said one or both of the first and second controllers according to the pressed function key.

In some embodiments, the remote control is configured such that when the monitoring unit detects that the mode control switch is in the middle position, the control unit sends the matching instruction to the first and second controllers, after the matching is completed, when a function key in the remote control is pressed, the control unit sends the operation instruction associated with the pressed function key to the first and second controllers.

In some embodiments, the remote control is configured such that when the monitoring unit detects that the mode control switch is in the R side position and a main key in the remote control is pressed, the control unit sends the matching instruction to the first controller, after the matching is completed, when a function key in the remote control is pressed, the control unit sends the operation instruction associated with the pressed function key to the first controller.

In some embodiments, the remote control is configured such that when the monitoring unit detects that the mode control switch is in the L side position and a main key in the remote control is pressed, the control unit sends the matching instruction to the second controller, after the matching is completed, when a function key in the remote control is pressed, the control unit sends the operation instruction associated with the pressed function key to the second controller.

In some embodiments, the control mode may include a first mode of controlling operations of the first bed unit independently when the mode control switch is in the R side position, a second mode of controlling operations of the second bed unit independently when the mode control switch is in the L side position, and a third mode of controlling operations of both the first and second bed unit synchronously when the mode control switch is in the middle position. In other words, in the control mode for which the mode control switch is in the R side position, the remote control is matched with the first controller of the first bed unit so that pressing a function key in the remote control causes the corresponding operation instructions to be sent to the first controller of the first bed unit, thereby operating the first drive assembly of the first bed unit to adjust the posture of the first bed unit accordingly. Similarly, in the control mode for which the mode control switch is in the L side position, the remote control is matched with the second controller of the second bed unit so that pressing a function key in the remote control causes the corresponding operation instructions to be sent to the second controller of the second bed unit, thereby operating the second drive assembly of the second bed unit to adjust the posture of the second bed unit accordingly. In addition, in the control mode for which the mode control switch is in the middle position, the remote control is matched with the first and second controllers of both the first and second bed units so that pressing a function key in the remote control causes the corresponding operation instructions to be sent to the first and second controllers of both the first and second bed units, thereby synchronously operating the first and second drive assemblies of the first and second bed units to adjust the posture of the first and second bed units accordingly. Therefore, by using the remote control, independent or synchronous operations of the first and second bed units of the adjustable bed can be realized.

In some exemplary embodiments, after the control mode is determined, for example, the mode control switch 101 is in the R side or L side position, i.e., a single-mode control is activated, which the activation is matched with one of the first and second controllers. It is also necessary to press the main key/button 102 in the remote control to complete the matching connection with a single one of the first and second controllers. It should be noted that during the matching connection of the single-mode control, at least one of the main key/button 102 in the remote control needs to be pressed to complete the matching connection. When the mode control switch 101 is in the middle position, the control mode of the adjustable bed is determined to be the double-mode control, that is, the first and second bed units of the adjustable bed are synchronously controlled.

As shown in FIG. 1, a function key in one embodiment refers to each button in the button area 104 on the remote control. When any function key on the remote control is pressed, the monitoring unit detects the state of the pressed function key, and the control unit sends function commands to the matched controller according to the pressed function key. In one embodiment, when the remote control and the first and second controllers on the adjustable bed are matched, the posture adjustment of the adjustable bed can be realized by pressing the function key. For example, the two bed units shown in FIG. 9 (the right bed unit 21 and the left bed unit 22) are individually controlled to make the head/back elevation different, while the two bed units shown in FIG. 7 (the right bed unit 21 and the left bed unit 22) are controlled synchronously to make the head/back elevation the same.

In another aspect of the invention, the adjustable bed includes first and second bed units, as shown in FIGS. 7-10, and a remote control, as shown in FIGS. 1-2, for controlling operations of the first and second bed units individually or cooperatively. As shown in FIGS. 7-10, the first bed unit 210 has a first driving assembly 211 and 212 configured to operably adjust the posture of the first bed unit 210. For example, the driving motors 211 and 212 of the first driving assembly are responsible for respectively driving the back and head broad(s) 215 and the thigh and leg boards 216 and 217 to move to desired positions, so as to adjust the posture of the first bed unit 210 accordingly. The first bed unit 210 also has a first controller coupled to the first driving assembly to control operations of the driving motors 211 and 212 of the first driving assembly, thereby adjusting the posture of the first bed unit 210. Similarly, the second bed unit 220 has a second driving assembly 221 and 222 configured to operably adjust the posture of the second bed unit 220. The driving motors 221 and 222 of the first driving assembly are responsible for respectively driving the back and head broad(s) 225 and the thigh and leg boards 226 and 227 to move to desired positions, so as to adjust the posture of the second bed unit 220 accordingly. The second bed unit 220 also has a second controller coupled to the driving motors 221 and 222 of the second driving assembly to control operations of the first driving assembly, thereby adjusting the posture of the second bed unit 220.

In some embodiment, each of the first and second controllers comprises a receiving unit configured to receive a matching instruction and an operation instruction sent by the remote control, and a processing control unit coupled to the receiving unit and configured to process the matching instruction and the operation instruction, connect to the remote control for matching connection, and control an operation of the corresponding one of the first and second drive assemblies according to the operation instruction.

In some embodiment, as disclosed above, the remote control has a plurality of function keys. Each function key, when pressed, in a pressed state is corresponding to a predetermined operation instruction. The plurality of function keys may also have a start button for operably controlling start or stop of the first and second controllers.

Figure 3:
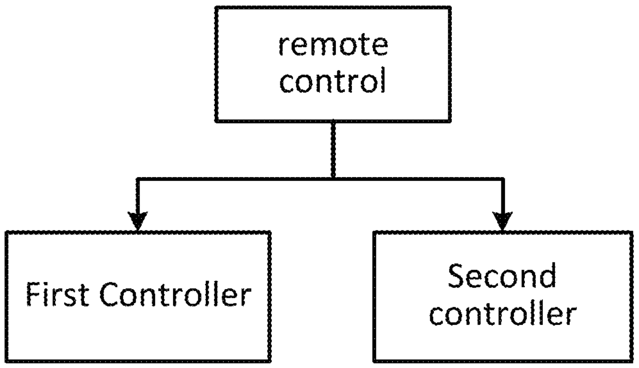
FIG. 3 shows a schematic diagram of a control system of an adjustable bed according to embodiments of the invention.

The adjustable bed can be controlled with the remote control to realize synchronous and independent operations of the two bed units. Based on the adjustable bed, one aspect of the invention also provides a control system for an adjustable bed, as shown in FIG. 3, which includes the remote control, and the adjustable bed including the first and second controller, as disclosed above.

To facilitate the control, the remote control in one embodiment has a start key to control the start or close of the first and second controllers. Before matching the remote control with the first and second controllers, one needs to start the start key first. In addition, during transportation or before use of the adjustable bed, the first and second controllers are turned off with the start key.

Another aspect of the invention also provides a remote control method for an adjustable bed as disclosed above.

In some embodiments, the method comprises the step of matching a remote control with one or both of the first and second controllers of the first and second bed units of the adjustable bed. The matching step comprises detecting a position state of a mode control switch of the remote control; determining a control mode of the adjustable bed based on the detected position state of the mode control switch; and sending a matching instruction to said one or both of the first and second controllers so as to establish a matching connection of the remote control with said one or both of the first and second controllers.

In some embodiments, when the mode control switch is detected in the middle position, the remote control sends a matching instruction to the first and second controllers, after the remote control is matched and coupled with the first and second controllers of the first and second bed units of the adjustable bed, pressing a function key in the remote control causes the first and second controllers to receive the operation instruction associated with the pressed function key.

In some embodiments, when the mode control switch is detected in the R side position and a main key in the remote control is pressed, the remote control sends a matching instruction to the first controller corresponding to the R side position, after the remote control is matched and coupled with the first controller, pressing a function key in the remote control causes the first controller to receive the operation instruction associated with the pressed function key.

In some embodiments, when the mode control switch is detected in the L side position and a main key in the remote control is pressed, the remote control sends a matching instruction to the second controller corresponding to the L side position, after the remote control is matched and coupled with the second controller, pressing a function key in the remote control causes the second controller to receive the operation instruction associated with the pressed function key.

In addition, the method also comprises the step of initiating operation instruction of one or both of the first and second bed units from the remote control so as to remotely operate the first and second bed units of the adjustable bed individually or cooperatively.

In some embodiments, said initiating the operation instruction comprises pressing a function key in the remote control corresponding to a head adjustment; sending, by the remote control, the operation instruction for adjusting the head posture to said one or both of the first and second controllers; and operating, by said one or both of the first and second controllers, the corresponding one or both of the first and second drive assemblies to adjust the head posture of the corresponding one or both of the first and second bed units accordingly.

In some embodiments, said initiating the operation instruction comprises pressing a function key in the remote control corresponding to a back adjustment; sending, by the remote control, the operation instruction for adjusting the back posture to said one or both of the first and second controllers; and operating, by said one or both of the first and second controllers, the corresponding one or both of the first and second drive assemblies to adjust the back posture of the corresponding one or both of the first and second bed units accordingly.

In some embodiments, said initiating the operation instruction comprises pressing a function key in the remote control corresponding to a leg adjustment; sending, by the remote control, the operation instruction for adjusting the leg posture to said one or both of the first and second controllers; and operating, by said one or both of the first and second controllers, the corresponding one or both of the first and second drive assemblies to adjust the leg posture of the corresponding one or both of the first and second bed units accordingly.

In some embodiments, said initiating the operation instruction comprises pressing a function key in the remote control corresponding to a reset; sending, by the remote control, the operation instruction for returning to the flat state to said one or both of the first and second controllers; and operating, by said one or both of the first and second controllers, the corresponding one or both of the first and second drive assemblies to return the first and second bed units to the flat state accordingly.

In some embodiments, said initiating the operation instruction comprises pressing a function key in the remote control corresponding to a head adjustment; cyclically sending, by the remote control, the operation instruction for adjusting the head posture to the first and second controllers; and operating, by the first and second controllers, the first and second drive assemblies to adjust the head posture of the first and second bed units accordingly.

In some embodiments, said initiating the operation instruction comprises pressing a function key in the remote control corresponding to a back adjustment; cyclically sending, by the remote control, the operation instruction for adjusting the back posture to the first and second controllers; and operating, by the first and second controllers, the first and second drive assemblies to adjust the back posture of the first and second bed units accordingly.

In some embodiments, said initiating the operation instruction comprises pressing a function key in the remote control corresponding to a leg adjustment; cyclically sending, by the remote control, the operation instruction for adjusting the leg posture to the first and second controllers; and operating, by the first and second controllers, the first and second drive assemblies to adjust the leg posture of the first and second bed units accordingly.

In some embodiments, said initiating the operation instruction comprises pressing a function key in the remote control corresponding to a reset; cyclically sending, by the remote control, the operation instruction for returning to the flat state to the first and second controllers; and operating, by the first and second controllers, the first and second drive assemblies to return the first and second bed units to the flat state accordingly.

Figure 4:
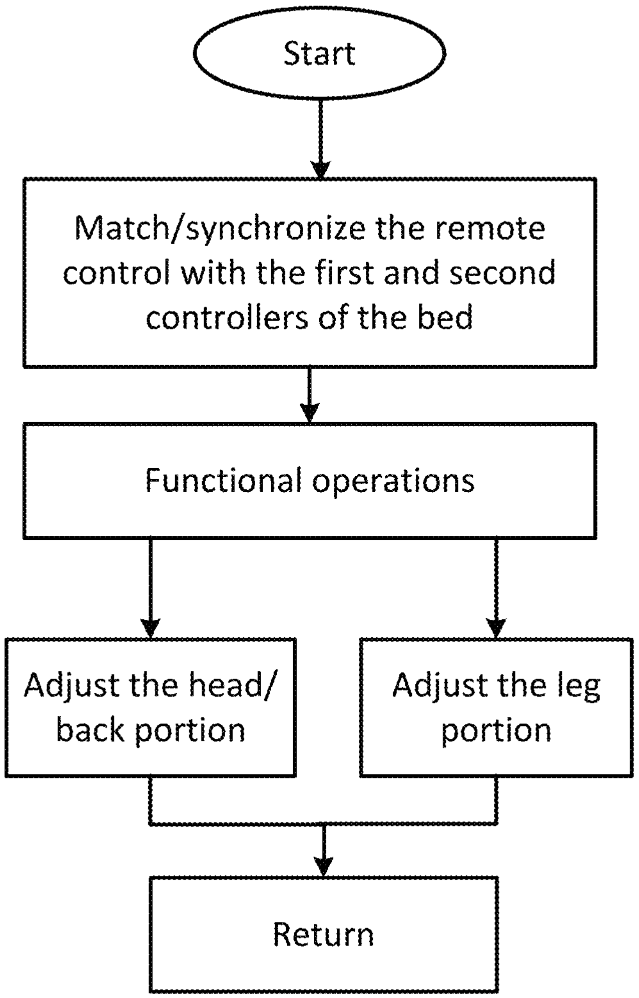
FIG. 4 shows schematically a control flow chart of an adjustable bed according to embodiments of the invention.
Figure 5:
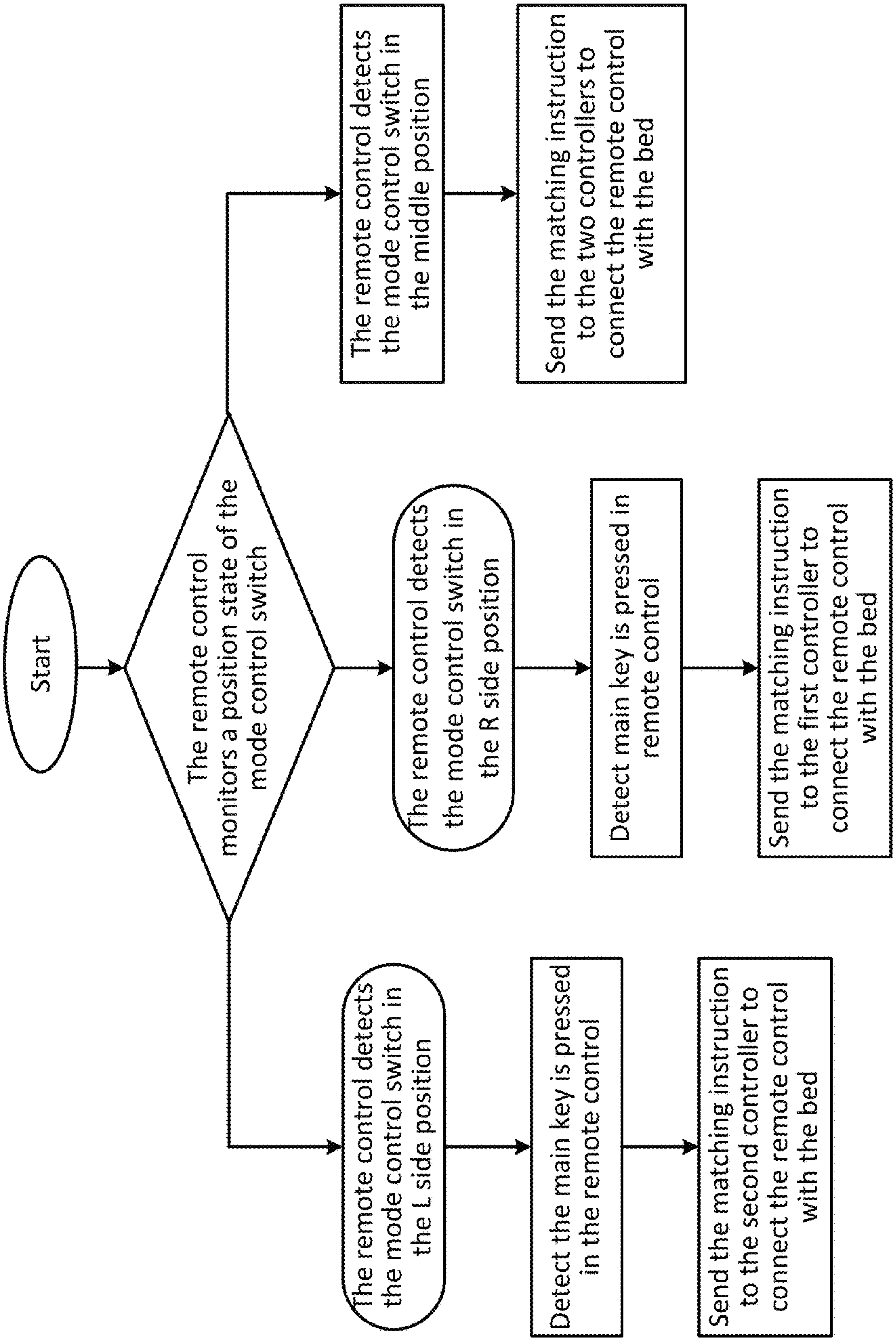
FIG. 5 shows schematically a flow chart of matching an adjustable bed and a remote control according to embodiments of the invention.
Figure 6:
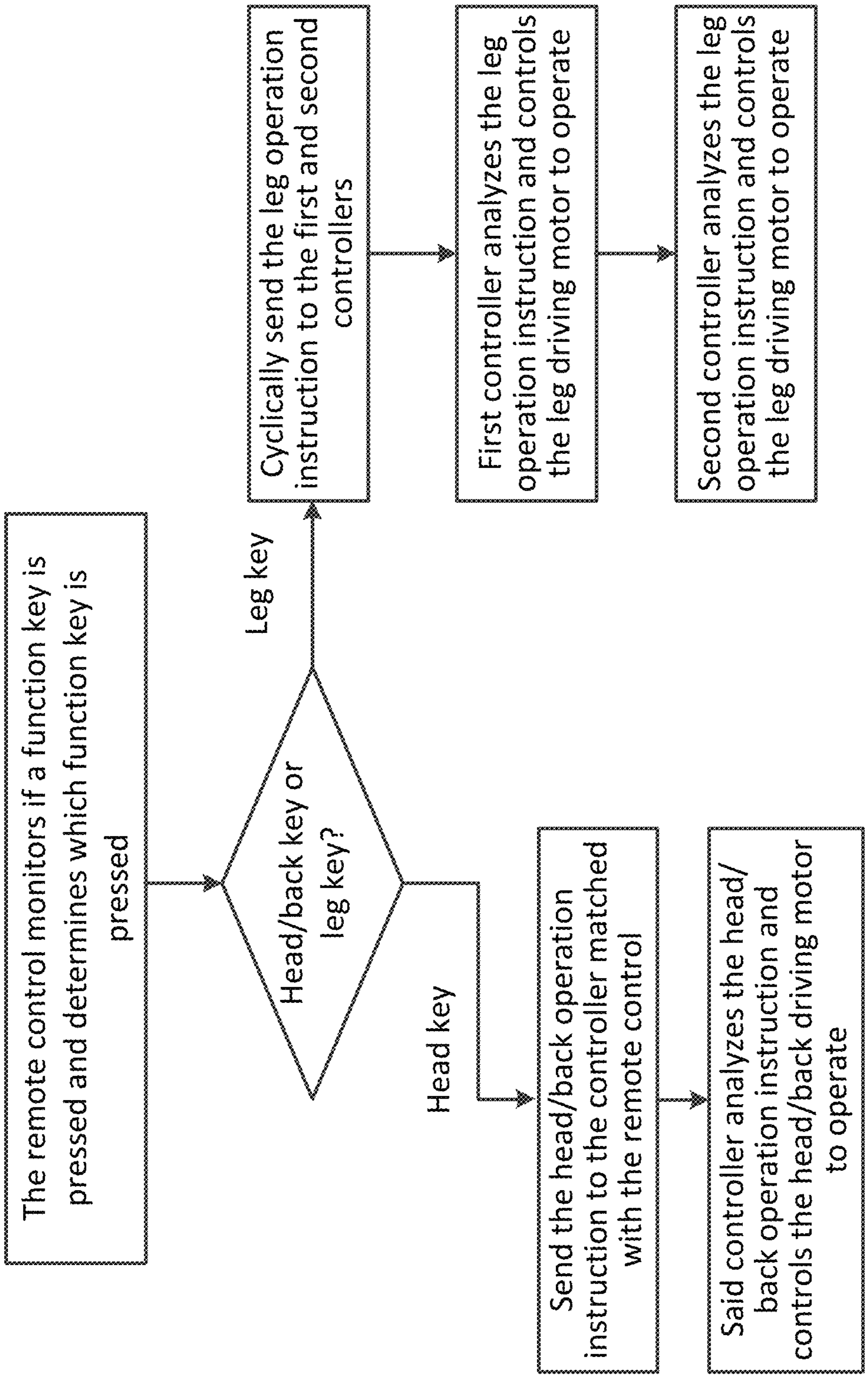
FIG. 6 shows schematically a functional control flow chart of an adjustable bed according to embodiments of the invention.

FIGS. 4-6 show exemplary embodiments of the remote control method for the adjustable bed, which includes the matching step of matching/synchronizing the remote control with the first and second controller of the adjustable bed, and functional operation steps to adjust the head and back and leg portions of the adjustable bed.

The matching step, as shown in FIG. 5, may include: the remote control monitors the position state of the mode control switch 101 on the remote control according to the position monitored by the monitoring unit, and determines the control mode of the adjustable bed, and sends a matching instruction to one or both of the first and second controllers on the adjustable bed, and connects the remote control with said one or both of the first and second controllers.

One specific matching process is: when the monitoring unit detects that the mode control switch 101 is in the middle position, the control unit sends matching instructions to the first and second controllers. After the matching is completed, the first and second controllers both receive the function instructions when a function key in the remote control is pressed.

When the monitoring unit detects that the mode control switch 101 is in the R side position, and the control unit detects that the main key/button 102 in the remote control is pressed, a matching instruction is sent to the first controller. After the matching is completed, when a function key of the remote control is pressed, the first controller receives the function instruction.

When the monitoring unit detects that the mode control switch 101 is in the L side position, and the control unit detects that the main key/button 102 in the remote control is pressed, a matching instruction is sent to the second controller. After the matching is completed, the second controller receives the function instruction when a function key in the remote control is pressed.

Figure 9:
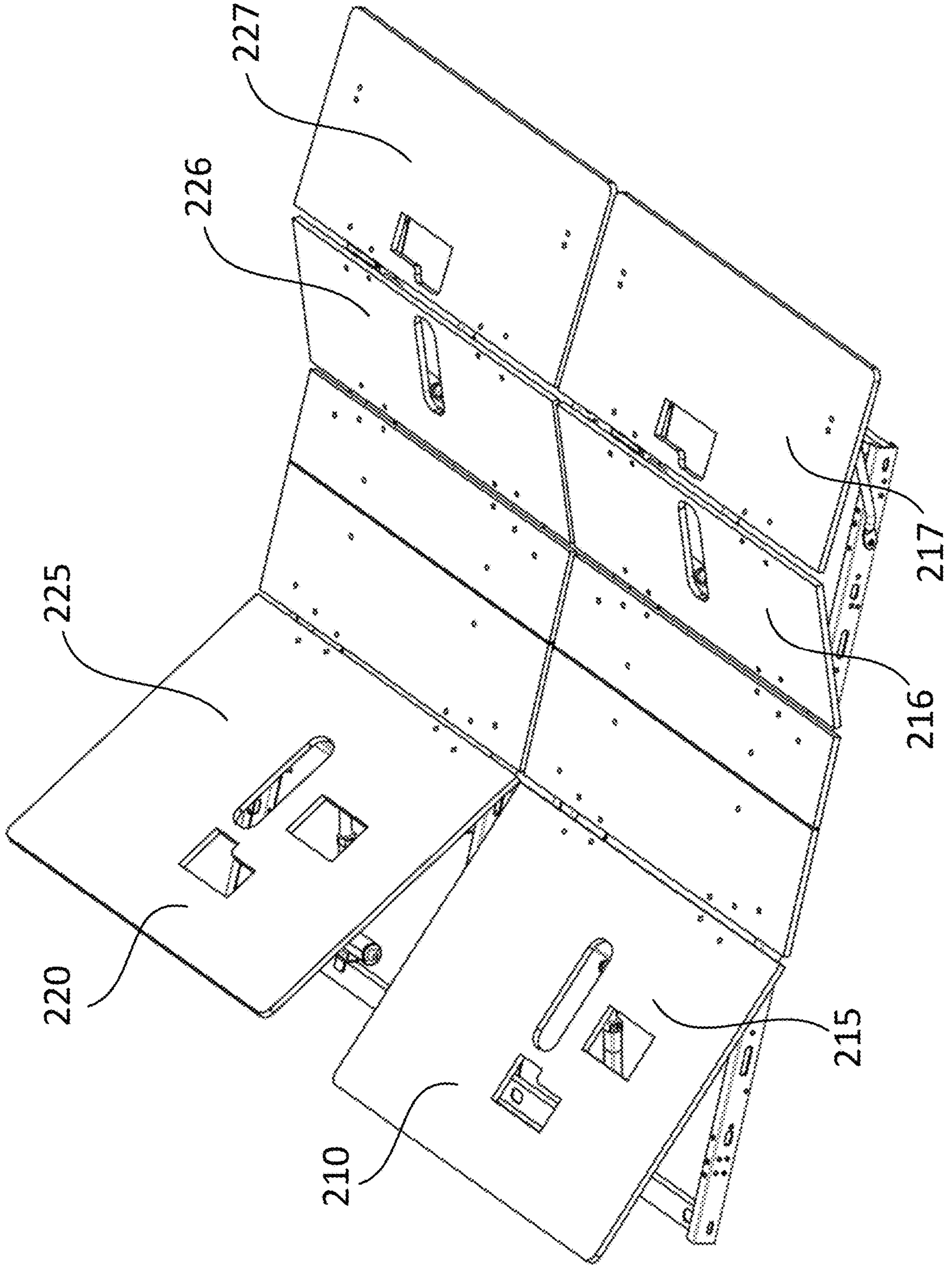
FIG. 9 shows schematically a front perspective view of an adjustable bed with the individual control of the two bed units according to embodiments of the invention.
Figure 10:
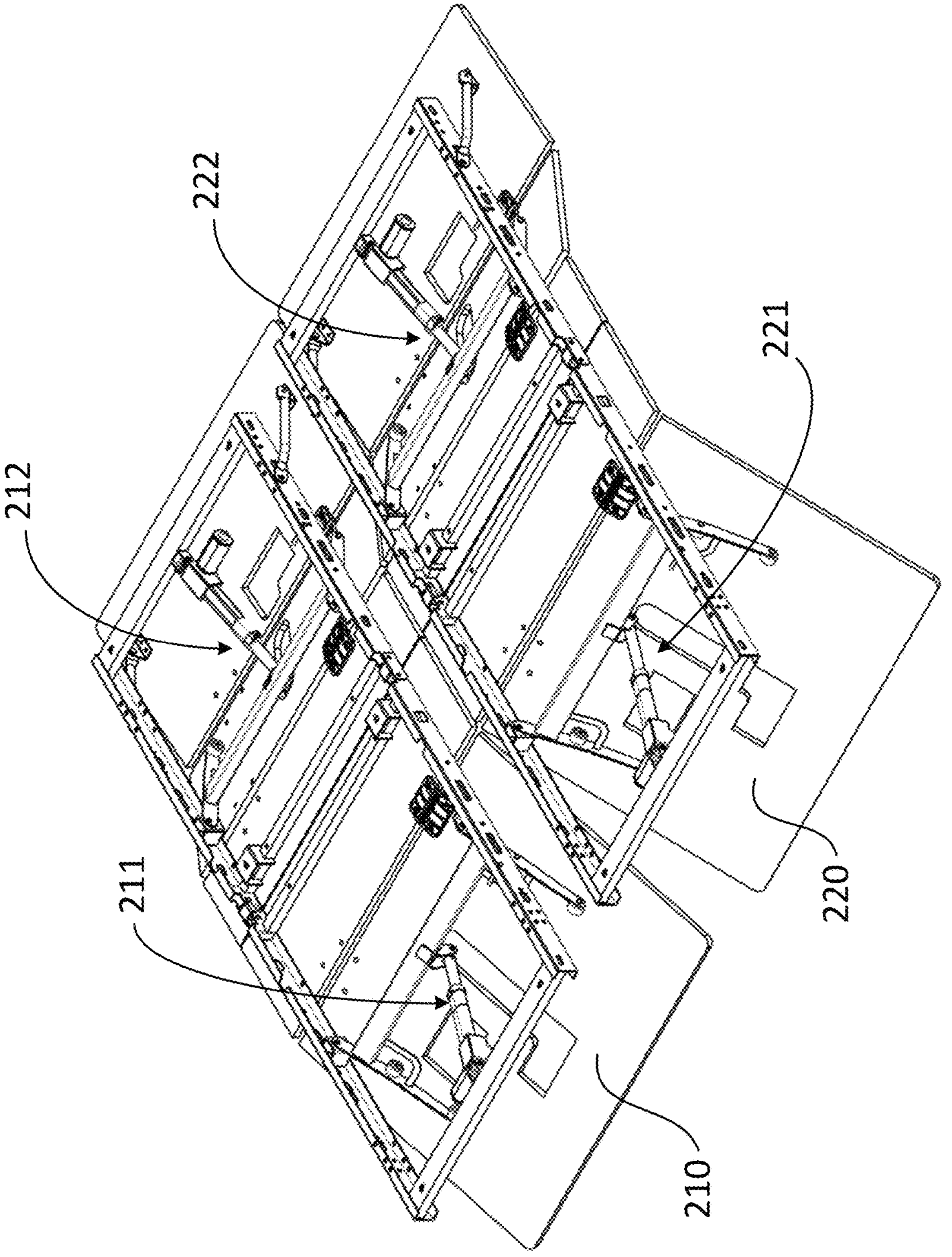
FIG. 10 shows schematically a rear perspective view of the adjustable bed of FIG. 9.

After the remote control is matched with the first controller or the second controller (the matched controller) in the above matching step, the functional operation steps specifically include: as shown in FIG. 6, the remote control detects if the function key for head adjustment, such as the head/back up key/button 105 in the key area 104 in the remote control, is pressed for the corresponding bed unit, the head/back posture adjustment command/instruction (referred to as the head operation instruction) is sent to the matched controller. The matched controller receives and analyzes the head/back operation instruction, and controls the operation of the head/back driving motor in the corresponding drive assembly. When the remote control detects that the function key corresponding to the leg adjustment is pressed, it cyclically sends the leg posture adjustment command/instruction (referred to as the leg operation instruction) to the first and second controllers, both the first and second controllers receive and analyze the leg operation instruction, and synchronously control the operations of the leg driving motors in the first and second drive assemblies. As shown in FIG. 9, the head/back operation instruction can achieve the head/back posture adjustments of the two bed units 210 and 220 individually, while the leg operation instruction can achieve the leg posture adjustments of the two bed units 210 and 220 simultaneously. As such, the head/back boards 215 and 225 of the right and left bed units 210 and 220 have different postures/positions, while the thigh and leg boards 216/217 and 226/227 of the two bed units 210 and 220 have same postures/positions.

Figure 7:
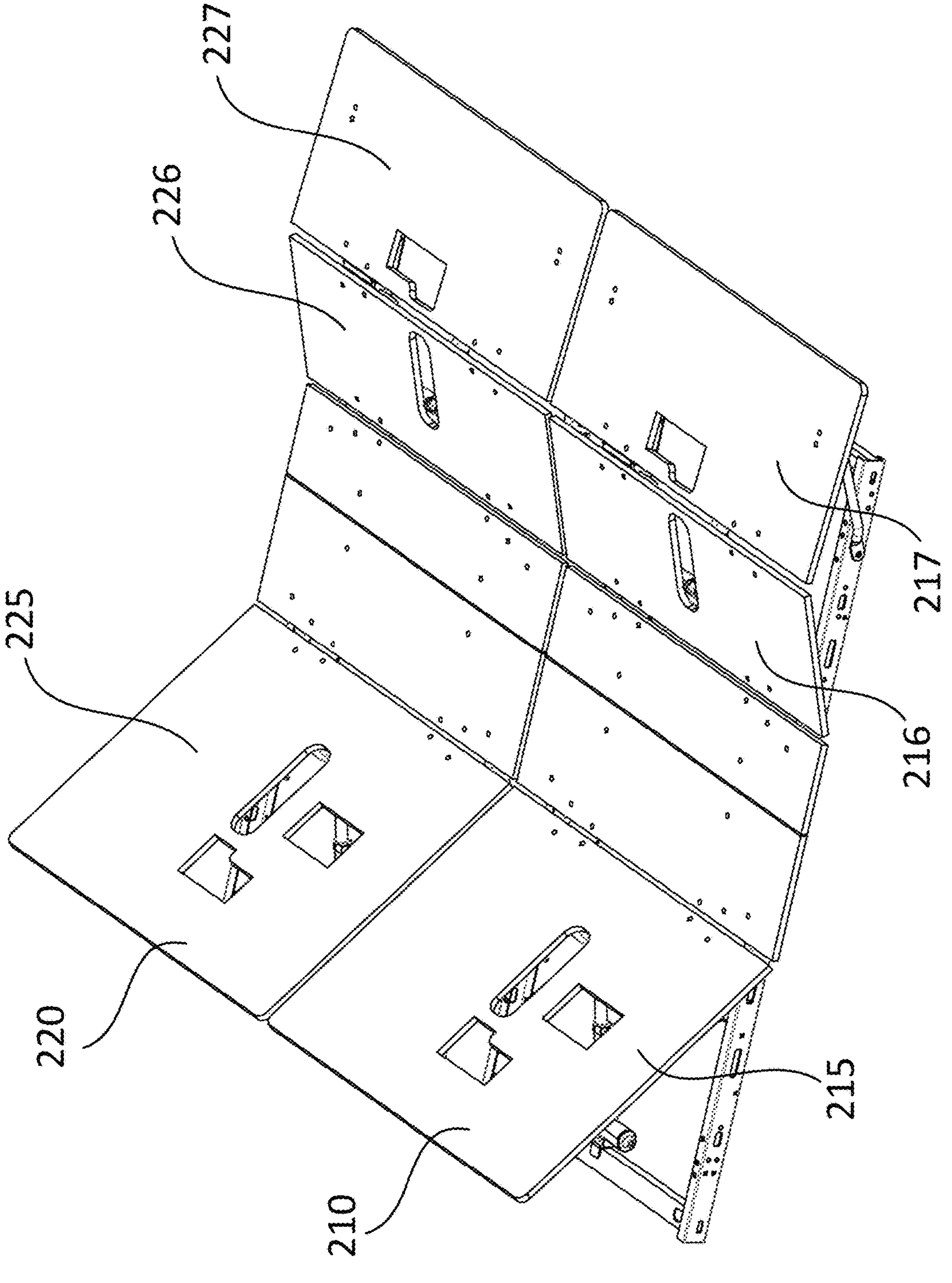
FIG. 7 shows schematically a front perspective view of an adjustable bed with the synchronous control of the two bed units according to embodiments of the invention.
Figure 8:
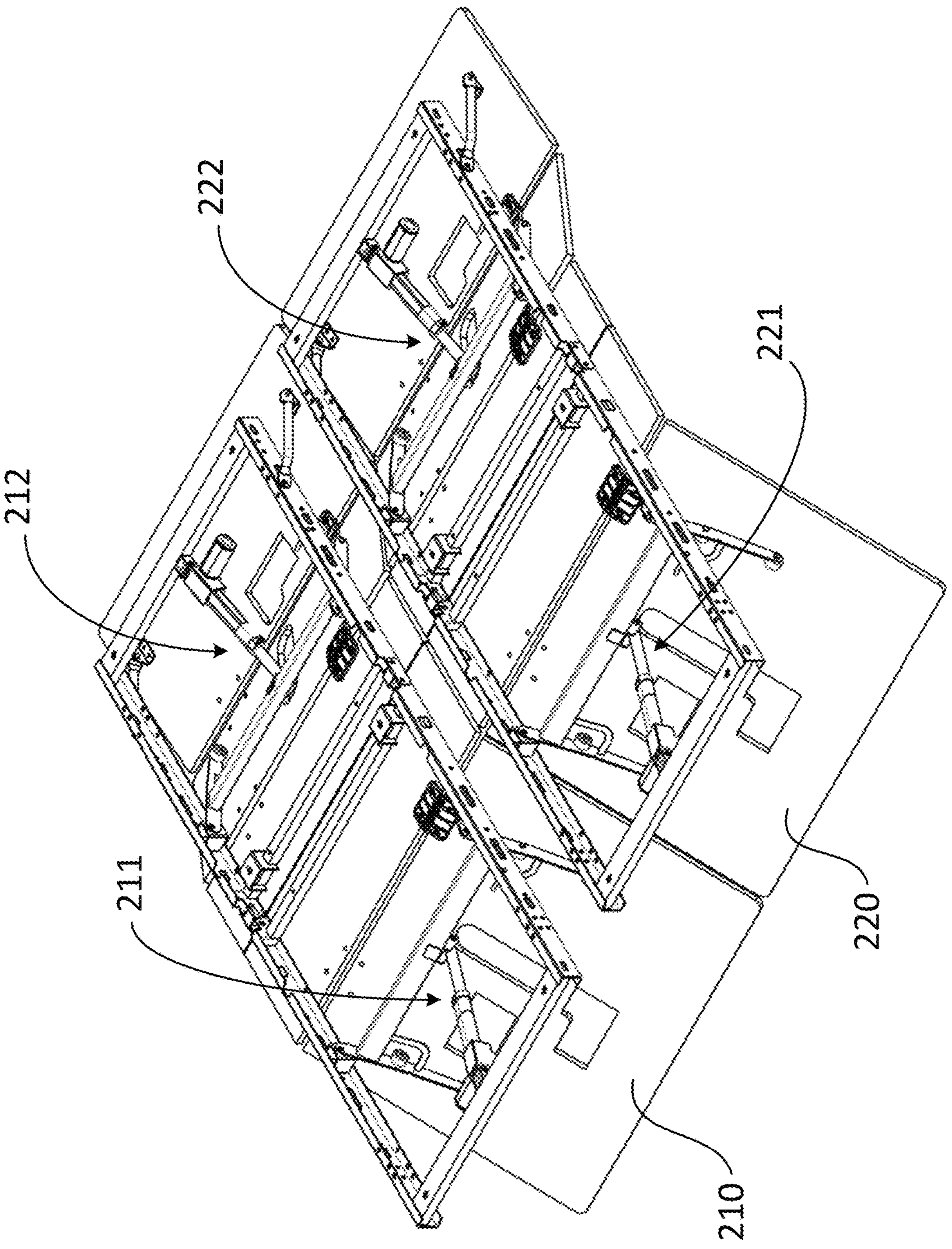
FIG. 8 shows schematically a rear perspective view of the adjustable bed of FIG. 7.

In addition, when the remote control is matched with the first controller and the second controller at the same time in the above matching step and the remote control detects that the function key corresponding to the head/back adjustment is pressed, it then cyclically sends the head/back operation instruction to the first and second controllers. The first and second controllers receive and analyzes the head/back operation instruction, and control the operations of the head/back driving motors in the first and second drive assemblies to achieve the synchronous head/back posture adjustments of the two bed units 210 and 220. When the remote control detects the function key corresponding to the leg adjustment is pressed, the leg operation instruction is sent to the first and second controllers cyclically. Both the first and second controllers receiver and analyzes the leg operation instruction and simultaneously control the operations of the leg driving motors in the first and second drive assemblies. As shown in FIG. 7, the head/back operation instruction can achieve the head/back posture adjustments of the two bed units 210 and 220 simultaneously, and the leg operation instruction can achieve the leg posture adjustments of the two bed units 210 and 220 simultaneously. As such, the head/back boards 215 and 225 of the right and left bed units 210 and 220 have same postures/positions, and the thigh and leg boards 216/217 and 226/227 of the two bed units 210 and 220 have same postures/positions, as well.

Moreover, when the function key corresponding to the reset in the remote control (i.e., the reset key/button 103) is pressed, the control unit of the remote control sends a reset instruction to the first and second controllers cyclically, and the first and second controllers control the first and second drive assemblies of the first and second bed units to return to the flat state.

In sum, the exemplary embodiments of the invention realizes the specific control of the adjustable bed by a remote control through the above control method, which can realize the independent adjustment or simultaneous adjustments of the first and second bed units of the adjustable bed, which is suitable for the double bed and can meet different needs of different users.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A remote control for controlling operations of an adjustable bed having first and second bed units, wherein the first and second bed units have first and second controllers for controlling operations of the first and second bed units, respectively, comprising:

a mode control switch, wherein the mode control switch has three position states including a right (R) side position, a middle position and a left (L) side position, and is operably slidable in one of the three position states;

a monitoring unit configured to detect the position state of the mode control switch; and a control unit coupled to the monitoring unit and configured to determine a control mode of the adjustable bed according to the position state of the mode control switch detected by the monitoring unit, and send a matching instruction to one or both of the first and second controllers of the first and second bed units based on the determined control mode so as to establish a matching connection of the remote control with said one or both of the first and second controllers.

2. The remote control of claim 1, further comprising a plurality of function keys, wherein each function key, when pressed, in a pressed state is associated with a predetermined operation instruction.

3. The remote control of claim 2, being configured such that when any one of the plurality of function keys in the remote control is pressed, the monitoring unit detects the pressed state of the pressed function key, and the control unit receives the pressed state of the pressed function key detected by the monitoring unit and sends said operation instruction to said one or both of the first and second controllers according to the pressed function key.

4. The remote control of claim 3, being configured such that when the monitoring unit detects that the mode control switch is in the middle position, the control unit sends the matching instruction to the first and second controllers, after the matching is completed, when a function key in the remote control is pressed, the control unit sends the operation instruction associated with the pressed function key to the first and second controllers.

5. The remote control of claim 3, being configured such that when the monitoring unit detects that the mode control switch is in the R side position and a main key in the remote control is pressed, the control unit sends the matching instruction to the first controller, after the matching is completed, when a function key in the remote control is pressed, the control unit sends the operation instruction associated with the pressed function key to the first controller.

6. The remote control of claim 3, being configured such that when the monitoring unit detects that the mode control switch is in the L side position and a main key in the remote control is pressed, the control unit sends the matching instruction to the second controller, after the matching is completed, when a function key in the remote control is pressed, the control unit sends the operation instruction associated with the pressed function key to the second controller.

7. The remote control of claim 2, wherein the plurality of function keys has a start button for operably controlling start or stop of the first and second controllers.

8. An adjustable bed, comprising:

first and second bed units, wherein the first and second bed units have first and second controllers for controlling operations of the first and second bed units, respectively; and the remote control of claim 1 for controlling operations of the first and second bed units individually or cooperatively.

* * * * *